Nov. 24, 1942.       R. O'NEILL       2,302,884
TRANSPARENT OIL LEVEL INDICATOR
Filed Jan. 13, 1942
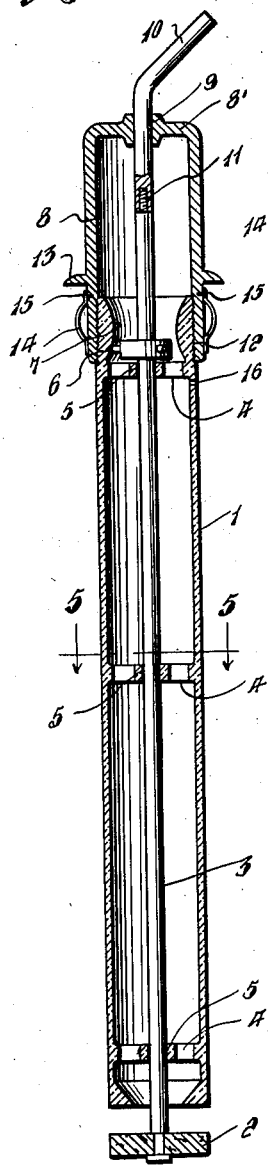
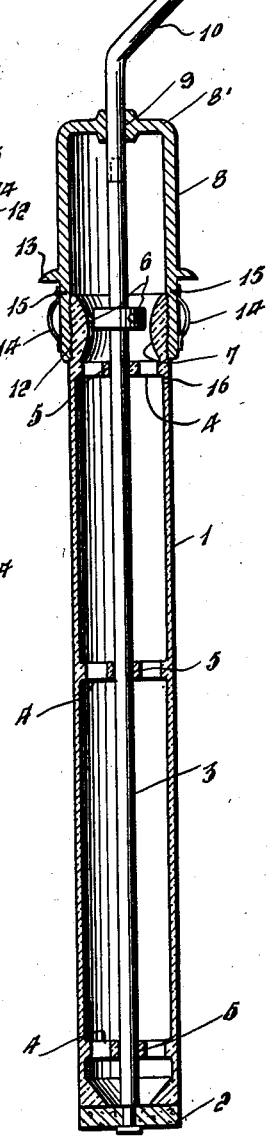
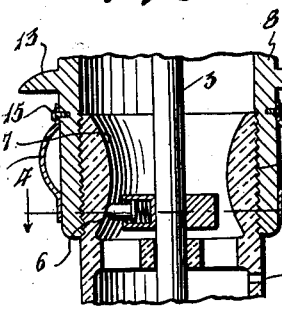
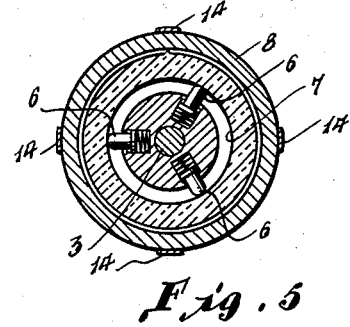
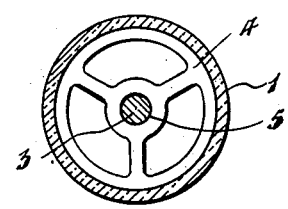
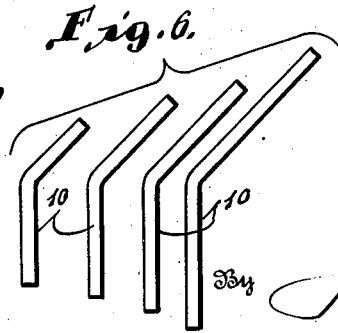
Inventor
Robert O'Neill
By
Attorney Patented Nov. 24, 1942

2,302,884

UNITED STATES PATENT OFFICE 2,302,884

TRANSPARENT OIL LEVEL INDICATOR

Robert O'Neill, Pleasant Mount, Pa.

Application January 13, 1942, Serial No. 426,632

1 Claim. (Cl. 33—126.4)

This invention relates to new and useful improvements in transparent oil level indicators, and is especially designed for use in connection with various types or makes of automobile or other motors where oil is used.

The primary object of my invention is to provide an indicator of the character specified, including a transparent casing, whereby the exact level of the oil in the motor may be easily and readily determined.

A further object of my invention is to provide a transparent oil level indicator, which is simple and economical in construction and highly efficient and durable in use.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a vertical longitudinal section, of a transparent oil level indicator, constructed in accordance with my invention.

Figure 2 is a similar view, with the valve closed.

Figure 3 is an enlarged detail fragmentary sectional view, of the upper end of the casing and associated parts.

Figure 4 is a horizontal section, taken on line 4—4 of Figure 3.

Figure 5 is a similar view, taken on line 5—5 of Figure 1, and

Figure 6 is a detail view, showing handles of varying length for use in connection with the upper end of the plunger.

Referring to the drawing for a more particular description of my invention, and in which drawing like parts are designated by like reference characters throughout the several views, my device essentially comprises the hollow cylindrical casing 1, constructed from suitable transparent material, and whose lower end is adapted to be closed by the valve 2, preferably in the form of a fibre washer or disc, as shown.

A plunger 3, preferably in the form of a steel rod, is attached at its lower end to the valve 2, and extends upwardly through and beyond the upper end of the transparent casing.

A series of three or more fibre rings 4, formed with central openings 5 to receive the plunger 3, are arranged at suitable predetermined intervals apart along the length of the casing 1, and serve to guide and stabilize the movement of the plunger. The upper end of the plunger is provided with the outwardly projecting spring pressed radially disposed pins 6, adapted to work against the convex wall or surface 7, formed at the upper end and inner wall of the casing, when the plunger is manipulated, and which co-act with said convex surface in holding the valve 2 in either open or closed position.

The device further comprises the hollow cap 8, formed in its top 8' with the central opening 9, to freely receive the handle 10. The handle 10 may be of varying length, as illustrated in Figure 6 of the drawing, to suit different types of engine motors on which the indicator may be used, and said handle is removably connected to the upper end of the plunger 3 by the threaded stem 11, or other equivalent means.

In practice, the valve 2 at the lower end of the casing 1, is first opened by manipulating the plunger 3, and the indicator placed in the oil case in this position. The indicator is allowed to rest on the bottom of the oil case in an upright position, which allows the oil to flow into the lower end of the casing. The lower end of the casing is closed after a certain interval of time, by exerting a slight pressure on the upper end of the casing, when the device is with-drawn and indicates the exact level of the oil in the engine. As indicated, the handle 10 slides through the opening 9 in the top of the hollow cap 8 and the valve is held against casual displacement in either of its two positions by the co-acting pins and convex surface 6 and 7, respectively.

In carrying out my invention, the lower end of the hollow cap 8 is screwed, as at 12, on the upper end of the hollow casing 1, and is provided near its lower end, but at a point somewhat above the upper end of the latter, with a stop 13, preferably in the form of an annular integral flange or shoulder, the purpose of which will be apparent. The lower end of the cap, immediately below the annular stop 13, is provided with a series of four or more corresponding bowed springs 14, to hold the device in place. The springs 14 are spaced equi-distances apart around the circumference of the cap and are held in place by the screws 15 or other equivalent means.

The upper end of the hollow casing 1, is provided with a small transverse port or vent 16, the purpose of which will be apparent.

From the foregoing description taken in connection with the drawing, it is thought that the construction, operation and advantages of my invention, will be readily understood, without requiring a more extended explanation.

Various changes in the form, proportions and minor details of construction may be resorted to without departing from the principles or sacrificing any of the advantages of my invention as defined in the appended claim.

Having described my invention, what I claim as new and desire to secure by Letters Patent, is:

An oil level indicator of the character specified, comprising a transparent casing, formed at its upper end and inner wall with a convex surface, a longitudinal plunger working in and extending through the casing, a valve secured to the lower end of the plunger and adapted to close the corresponding end of the casing, guide rings carried by the inner wall of the casing, for the plunger, a handle removably connected to the upper end of the plunger and outwardly projecting spring pressed radial pins carried by the upper end of the plunger and yieldingly engaging the convex surface at the upper end of the casing in holding the valve against casual displacement in both open and closed positions.

ROBERT O'NEILL.